United States Patent Office 2,987,489
Patented June 6, 1961

2,987,489
POLYMERIZATION OF EPOXIDES
Frederick E. Bailey, Jr., Charleston, and Fred N. Hill, South Charleston, W. Va., assignors to Union Carbide Corporation, a corporation of New York
No Drawing. Filed Nov. 19, 1958, Ser. No. 774,823
15 Claims. (Cl. 260—2)

This invention relates to a process for polymerizing epoxide compounds and to the products resulting therefrom.

This application is a continuation-in-part of application Serial No. 687,620 entitled "Ethylene Oxide Copolymers," by F. E. Bailey, Jr. and F. N. Hill, filed October 2, 1957, now abandoned and application Serial No. 587,933 entitled "Polymerization of Epoxides," by F. E. Bailey, Jr. and F. N. Hill, filed May 29, 1956, now abandoned. Said application Serial No. 687,620 is, in turn, a continuation-in-part of application Serial No. 587,935 entitled "Ethylene Oxide Copolymers." by F. E. Bailey, Jr. and F. N. Hill, filed May 29, 1956, now abandoned. All of the above applications are similarly assigned to the same assignee as the instant application.

In a broad aspect the instant invention is directed to the process for polymerizing 1,2-alkylene oxide in contact with a catalytically significant quantity of a divalent metal carbonate catalyst described hereinafter to produce solid polymers.

It is deemed appropriate at this time to define the term "reduced viscosity" since this term will be frequently employed throughout the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., benzene or acetonitrile, at 30° C.

By the term "1,2-alkylene oxide," as used herein including the appended claims, is meant an organic compound which contains solely carbon, hydrogen, and oxirane oxygen, said oxirane oxygen being bonded to vicinal or adjacent carbon atoms to form the following epoxy group, i.e.,

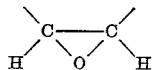

and wherein each unsatisfied epoxy carbon valence of said group is satisfied by hydrogen or a hydrocarbon radical free from ethylenic and acetylenic unsaturation, e.g., alkyl, cycloalkyl, aryl, aralkyl, or alkaryl. In addition, both unsatisfied epoxy carbon valences collectively can represent a divalent saturated aliphatic hydrocarbon radical which together with the epoxy carbon atoms form a saturated cycloaliphatic hydrocarbon nucleus which contains from 4 to 10 carbon atoms inclusive. It is to be understood, also, that the term "lower 1,2-alkylene oxides" designates that each unsatisfied epoxy carbon valence of the above-depicted structural unit can be satisfied by hydrogen or a lower alkyl, e.g., methyl, ethyl, propyl, isobutyl, and the like.

Accordingly, one or more of the following objects will be achieved by the practice of this invention.

It is an object of this invention to provide a novel process for polymerizing 1,2-alkylene oxide in contact with a catalytically significant quantity of a divalent metal carbonate catalyst. It is also an object of this invention to provide a noval process for polymerizing an admixture of two or more different 1,2-alkylene oxides in contact with a catalytically significant quantity of a divalent metal carbonate catalyst. It is another object of this invention to provide a novel process for polymerizing an admixture comprising greater than 50 weight percent of a lower 1,2-alkylene oxide, preferably ethylene oxide, and less than 50 weight percent of a different 1,2-alkylene oxide, based on the weight of the 1,2-alkylene oxide charge. A further object of this invention is to prepare solid polymers in accordance with the teachings herein set forth. A further object of this invention is directed to the preparation of resinous poly (ethylene oxide). A yet further object is directed to the preparation of solid copolymers, the properties and characteristics of which can be "tailor-made" to fit a wide variety of uses and fields of applications. Other objects will become apparent to those skilled in the art in the light of the instant specification.

As indicated previously, the broad aspect of this invention is directed to polymerizing 1,2-alkylene oxide in contact with a divalent metal carbonate catalyst to produce solid polymers. A single 1,2-alkylene oxide or an admixture of at least two different 1,2-alkylene oxides can be employed as the monomeric feed.

In one embodiment the monomeric 1,2-alkylene oxide employed, a vicinal-epoxyhydrocarbon which has a single vicinal epoxy group and which is free from unsaturation other than benzenoid unsaturation, in the polymerization process of this invention can be characterized by the following formula:

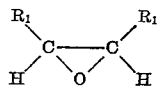

wherein each $R_1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables collectively can represent a divalent saturated aliphatic hydrocarbon radical which together with the epoxy carbon atoms, i.e., the carbon atoms of the epoxy group,

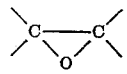

form a saturated cycloaliphatic hydrocarbon nucleus containing from 4 to 10 carbon atoms, preferably from 4 to 8 carbon atoms, for example, a saturated cycloaliphatic hydrocarbon nucleus such as derived from cycloalkane, alkyl-substituted cycloalkane, cyclobutane, cyclopentane, cyclohexane, cycloheptane, cyclooctane, methylcyclopentane, amylcyclohexane and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is preferred that a lower 1,2-alkylene oxide be employed as starting material in the homopolymerization reaction. In polymerizing an admixture comprising two different 1,2-alkylene oxides, it is also preferred that one of the 1,2-alkylene oxides be a lower 1,2-alkylene oxide.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, chlorostyrene oxide, styrene oxide, ortho-, meta-, and paraethylstyrene oxide, glycidyl benzene, the oxabicycloalkanes and the alkyl-substituted oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane, and the like.

The metal carbonates contemplated as catalysts in the process of the instant invention are the carbonates of divalent metals which have an atomic number greater than 11 and which are found below potassium and above tin in the Electromotive Force Series of Elements [1]. These divalent metals include magnesium, calcium, strontium, barium, zinc, cadmium, iron, cobalt, nickel, chromium, and manganese. Particularly preferred metal carbonates, from the standpoint of increased catalytic activity and/or ease of preparation in pure form, are the group IIA metal carbonates, i.e., the calcium, strontium, or barium carbonates; group IIB metal carbonates, i.e., the zinc or cadmium carbonates; manganous carbonate; and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely understood at this time nor is it the desire of the inventors to be bound by any theories regarding adsorption or absorption phenomena. It is suffice to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

Since the instant invention contemplates the use of several divalent metal carbonates as novel catalysts in the polymerization reaction, and further, since various factors or considerations will influence the optimum weight range of the sorbed water content in the metal carbonates, no simple rule of thumb can be expounded regarding an overall weight range of sorbed water content which should be contained by the metal carbonate catalysts. However, by following the illustrative teachings set forth in this specification one skilled in the art can readily determine by routine experimentation the amount of sorbed water which is necessary to impart optimum catalytic activity to the metal carbonate.

[1] Handbook of Chemistry and Physics, 38th Edition, page 1660; published by Chemical Rubber Publishing Co., Cleveland, Ohio.

It has been observed that divalent metal carbonates which have been prepared in aqueous media and subsequently dried (by air-drying under reduced pressure at slightly elevated temperatures, until they tend to be essentially free-flowing powders or until they can be so rendered such as by grinding, but not substantially beyond that point) will result in a catalytically activated metal carbonate. In other words, there is obtained a metal carbonate which contains an amount of sorbed water which is sufficient to significantly activate an otherwise essentially inactive metal carbonate. Moreover, a metal carbonate which has been rendered catalytically inactive such as by overdrying caused by heating said carbonate at high temperatures for an extended period of time, i.e., drying the carbonate past the point which deprives it of the pre-requisite amount of sorbed water that is necessary to impart catalytic activity to said carbonate, can be once again rendered catalytically active by mixing or slurrying the metal carbonate in water and subsequently drying same to the point where it essentially reaches the free-flowing powdery stage.

Furthermore, when it has been observed that the divalent metal carbonates are significantly catalytically activated by virtue of the contained sorbed water the polymerization reaction is capable of being initiated within a reasonable time and at a reasonable rate, i.e., the polymerization reaction will commence within 16 hours at a rate of at least approximately 3 to 5 percent conversion per hour. The time lag noted prior to the initiation of the polymerization reaction is generally known as the induction period. In general, the polymerization reaction is initiated within a reasonable time and at a reasonable rate when the minimum quantity of sorbed water is about 0.01–0.02 weight percent, based on the weight of the divalent metal carbonate catalyst. It is preferred, in general, that the minimum quantity of sorbed water be above about 0.1 weight percent, based on the weight of the divalent metal carbonate catalyst. The upper limit regarding the amount of sorbed water which the catalyst can contain is a natural limit depending, to a great extent, on various factors such as those previously discussed.

The sorbed water content of the metal carbonate can be readily determined by various means which are well-known to the art. For instance, a weighed quantity of powdery metal carbonate, e.g., strontium carbonate, can be heated to a temperature of about 350° to 400° C. until an essentially constant weight metal carbonate is obtained. The weight difference in the original sample and the heat-treated sample (to constant weight) is the loss of essentially sorbed water in the original sample. The weight percent of sorbed water in the original metal carbonate sample thus is readily calculable. However, should the metal carbonate decompose or should the danger of decomposition exist under the conditions noted in the above-described determination of sorbed water content, an alternative method can be employed such as is immediately illustrated below. For example, zinc carbonate can undergo at least partial decomposition at 350° to 400° C. to zinc oxide and carbon dioxide. Thus, a weighed quantity of powdery zinc carbonate can be inserted into a quartz tube which is then placed into an ignition furnace maintained at approximately 425° C. A continuous stream of high purity nitrogen is subsequently passed over the zinc carbonate and through a weighed tube containing, for example, magnesium perchlorate. The magnesium perchlorate is an agent which readily absorbs water but not carbon dioxide. This operation is continued until the zinc carbonate is essentially decomposed to zinc oxide (and this point will be reached when the heated sample has attained a constant weight). The increased weight of the tube containing magnesium perchlorate is attributable to the sorbed water given off during heat treatment of the carbonate sample Again, the weight percent of sorbed water contained by the zinc corbonate sample thus is readily determined.

To illustrate the catalytic activity imparted to the metal carbonate by virtue of the contained sorbed water, one preparation of strontium carbonate (prepared by bubbling carbon dioxide into a solution of strontium hydroxide octahydrate in distilled water, and subsequently recovering the resulting strontium carbonate precipitate) which was dried at 50° C. for 16 to 18 hours contained approximately 3 weight percent of sorbed water. This catalyst was found to be satisfactorily active as a polymerization catalyst at a concentration of 3 weight percent (based on the weight of reagent). A sample of this strontium carbonate dried at higher temperatures wherein the amount of sorbed water was decreased to approximately 0.1 to 0.2 weight percent exhibited virtually unchanged catalytic activity. However, when dried for 16 to 18 hours at about 325° C. the sorbed water content contained in the strontium carbonate was reduced to about 0.01 to 0.02 weight percent. At this point, the catalytic activity of the strontium carbonate containing about 0.01 to 0.02 weight percent was lessened as compared to the strontium carbonate containing about 0.1 to 0.2 weight percent sorbed water. Further drying at temperatures above 350° C. for an additional 16 to 18 hours rendered the strontium carbonate essentially inactive as the polymerization catalyst.

By way of illustration, zinc carbonate containing approximately 20 weight percent sorbed water (prepared in a manner similar to that set out in Example 10) was an active polymerization catalyst at a concentration of 3 weight percent with essentially no induction period being observed. Increasing the sorbed water content on the zinc carbonate up to 48 weight percent correspondingly increased the induction period of the polymerization reaction. For example, an induction period of several minutes was observed with zinc carbonate containing 28 weight percent sorbed water whereas the induction period increased to 24 hours, and longer, with the use of zinc carbonate containing 48 weight percent sorbed water.

As previously indicated the water associated with the catalytic activity of the metal carbonates is sorbed water. Non-sorbed water or extraneous water does not directly effect the catalytic activity of the metal carbonate catalyst; however, non-sorbed water or extraneous water present with the catalyst or contained in the monomeric reagents can inordinately prolong the induction period or the initiation of the polymerization reaction. Consequently, it is highly desirable to minimize the quantity of non-sorbed water present in the charge comprising catalyst and monomeric reagents. Factors which influence the amount of non-sorbed water to be tolerated in a particular system in order to obtain optimum operative conditions are, for example, the particular metal carbonate employed, the particle size of the metal carbonate, the monomeric reagent(s) employed, the method by which the metal carbonate was prepared, and other considerations. Generally, satisfactory polymerization rates are obtained when the quantity of non-sorbed water or extraneous water present in the charge comprising catalyst and monomeric reagents does not exceed about 1 weight percent, preferably about 0.5 weight percent, based on the weight of monomeric reagent(s); however, higher quantities of non-sorbed water can be present but, as stated previously, the induction period may be inordinately increased. Consequently, it is highly preferred that the metal carbonate catalyzed polymerization reaction be inducted under substantially anhydrous conditions.

It has also been observed that certain adsorbed or occluded ions such as oxygenated and "thio-oxygen" anions tend to markedly decrease the catalytic activity of the metal carbonate catalyst. A notable exception is the sulfate ion. On the other hand, adsorbed or occluded chloride, cyanide or acetate ions do not appear to deleteriously affect the catalytic activity of the metal carbonates. It is further desirable that the divalent metal carbonates be prepared in the absence of nitrate ion, chlorate ion, thiosulfate ion, or tetraborate ion since the substantial presence of these ions can result in considerably long induction periods. However, thoroughly water-washing the divalent metal carbonates prepared in the presence of the above-illustrated interfering ions will serve to essentially remove these ions.

Infra-red absorption data of various metal carbonates were obtained by scanning the 2–16 micron region on the Baird spectrophotometer. The technique used to study the infra-red absorption of the metal carbonates was similar to that described by French et al.[2] All samples were prepared by pressing the various metal carbonates studied into potassium bromide pellets (usually 5 weight percent metal carbonate; 0.03 inch die). The spectra of active strontium carbonate were essentially identical with respect to wave length of absorption bands; however, there appeared a noticeable difference in the absorption intensity of the bands. Catalytically active strontium carbonate A exhibited a strong hydroxyl absorption band at 2.95 microns and the overall spectrum was sharp and well defined. Catalytically active strontium carbonate B (originally active, then inactivated by heating at elevated temperatures, and subsequently activated again by admixing with water followed by modest drying) gave a less intense hydroxyl band at the 2.95 micron region. Inactive strontium carbonate C (deactivated by heating above 350° C. for about 48 hours) exhibited a "washed out" appearance at the 2.95 micron band. In language more readily understood by those skilled in the spectroscopy art, catalytically active strontium carbonate A, used as the control, had an absorbance of 0.259 optical density units at the 2.95 micron water band. Catalytically active strontium carbonate B had an absorbance of 0.137 optical density units at the 2.95 micron region (which was 53 percent of the water found in the control). Inactive strontium carbonate C had an absorbance of only 0.048 optical density units at the 2.95 micron region (which was approximately 18 percent of the water found in the control). All of the above absorbance measurements were corrected to the same pellet or plaque thickness as that of the control, employing the 5.65 micron band, i.e., thickness corrected to 0.031 inch by the absorbance of 0.455 optical density units of the control at 5.65 microns of a 5 weight percent concentration of strontium carbonate in dry potassium bromide.

The method by which the metal carbonate was prepared gave interesting and informative infra-red absorption data. Strontium carbonate prepared by precipitation from the hydroxide solution with carbon dioxide, followed by drying at moderate temperature, was catalytically active. The spectrum of this metal carbonate showed an intense hydroxyl absorption band at the 2.95 micron region. Likewise, strontium carbonate prepared from strontium acetate and sodium carbonate, or from strontium chloride and sodium carbonate, were catalytically active. The spectra of these strontium carbonates were essentially identical to the spectrum of the previously discussed active strontium carbonate. The preparation of strontium carbonate from strontium nitrate and sodium carbonate gave an inactive catalyst. This inactive carbonate exhibited a strong hydroxyl absorption band at the 2.95 micron region and a band at the 12 micron region which can be attributed to adsorbed or coprecipitated nitrate ion. For comparison purposes, the absorption spectrum of potassium nitrate was obtained in the same manner; the characteristic absorption bands of the nitrate ion at the 7.2–7.5 and 11.8–12.3 micron regions was evident (Miller and Wilkens, Ann. Chem., vol. 24, #8, 1253). However, inactive strontium carbonate (exhibiting nitrate ion contamination) when thoroughly digested

---

[2] Journal of Physical Chemistry, French, Wadworth, Cook and Cutler, vol. 58, page 805 (1954).

with water and carbon dioxide became catalytically active; the absorption band at the 12 micron region of this digested carbonate was nil. Similarly, in active barium carbonate prepared from barium nitrate and sodium carbonate contained a weak absorption band at the 12.1 micron region. Active barium carbonate prepared from barium chloride and barium carbonate had no absorption band in this region and its spectrum was essentially identical with active barium carbonate prepared by precipitation from the hydroxide solution with carbon dioxide. In addition, the preparation of various alkaline earth metal carbonates carried out in the presence of sodium nitrate, sodium chlorate, sodium thiosulfate, and sodium tetraborate gave inactive catalysts.

The metal carbonates suitable as catalysts in the process of the instant invention can be prepared by reacting the corresponding divalent metal salt, e.g., the divalent metal chloride, cyanide, and acetate, with sodium carbonate, or other soluble carbonate, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide. The divalent metal carbonates contemplated as catalysts can also be prepared from salts of the appropriate divalent metal in which the anionic component thereof is one of the interfering ions enumerated previously. However, the preparation should be carried out so as to minimize the presence of adsorption or occlusion of these interfering ions in the desired carbonate product, e.g., slow precipitation of the carbonate product from relatively dilute aqueous solution, followed by thorough washing or digesting said precipitated carbonate with water or water-containing carbon dioxide.

The divalent metal carbonate is employed in catalytically significant quantities. In general, a catalyst concentration in the range of from about 0.01 to about 5 weight percent, and higher based on the weight of monomeric feed, is suitable. Advantageous results are obtained by employing the group IIA metal carbonates at a concentration in the range of from about 0.3 to 3 weight percent, based on the weight of the monomeric feed. Manganese carbonate can be employed at a concentration of from about 0.1 to 1.0 weight percent, based on the weight of the monomeric feed, with effective results. For optimum results, the particular divalent metal carbonate employed, its preparation, its surface area, the nature of the monomeric reagent(s), the operative temperature at which the polymerization reaction is conducted, and other factors will largely determine the desired catalyst concentration.

The polymerization reaction can be conducted over a wide temperature range. Preferably, the polymerization reaction is conducted at a temperature in the range of from about 70° to about 150° C., and more preferably from about 90° C. to about 150° C. As a practical matter, the choice of the particular temperature at which to effect the polymerization reaction depends, to an extent, on the nature of the 1,2-alkylene oxide reagent(s) and particular catalyst employed, the concentration of the catalyst, and the like.

In general, the reaction time will vary depending on the operative temperature, the nature of the 1,2-alkylene oxide reagent(s) employed, the particular catalyst and the concentration employed, the use of an inert organic diluent, and other factors. The reaction time can be as short as a few hours in duration, or shorter, or it can be as long as several hours, e.g., 24 hours. A feasible and suitable reaction period is from about 5 hours, and lower, to about 36 hours, and preferably from about 5 hours to about 24 hours.

When polymerizing an admixture containing two different 1,2-alkylene oxides, the proportions of said 1,2-alkylene oxides can vary over the entire range. Preferably the concentration of either monomeric 1,2-alkylene oxide is in the range of from about 5 to about 95 weight percent, based on the total weight of said 1,2-alkylene oxides.

The polymerization reaction takes place in the liquid phase and a pressure above atmospheric is generally employed to maintain the liquid phase. However, in the usual case, external pressure is unnecessary, and it is only necessary to employ a reaction vessel capable of withstanding the autogenous pressure of the reaction. It is highly desirable to conduct the polymerization reaction under substantially anhydrous conditions.

The polymers of this invention can be prepared via the bulk polymerization, suspension polymerization or the solution polymerization routes. The polymerization reaction can be carried out in the presence of an inert organic diluent such as, for example, aromatic hydrocarbons, e.g., benzene, toluene, xylene, ethylbenzene, chlorobenzene, and the like; various oxygenated organic compounds such as anisole, the dimethyl and diethyl ethers of ethylene glycol, propylene glycol, diethylene glycol and the like; normally-liquid saturated hydrocarbons including the open chain, cyclic, and alkyl-substituted cyclic saturated hydrocarbons such as pentane, hexane, heptane, various normally-liquid petroleum hydrocarbon fractions, cyclohexane, the alkylcyclohexanes, decahydronaphthalene, and the like.

An induction period may be observed in that the polymerization is not initiated immediately. The induction period can be as short as or shorter than minutes in length with the more active catalysts or it can be several hours in duration. This induction period depends not only on the individual metal carbonate, its preparation, its surface area, the concentration of the metal carbonate, the nature of the monomeric feed, the reaction temperature, the purity of the monomeric feed, and other factors. Certain impurities which may be present in the 1,2-alkylene oxide(s) have an inhibiting effect on the polymerization reaction, these impurities being carbon dioxide, oxygen, aldehydes, and water. In particular, the inhibiting effect of water and oxygen appears in prolongation of the induction period prior to the initiation of the polymerization reaction. Small amounts of these impurities may be tolerated; however, it is highly advantageous to employ high purity reagents, catalyst, etc., thus avoiding inordinately prolonged induction periods.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product. Recovery of the precipitated polymer can be effected by filtration, decantation, etc., followed by drying same as indicated previously.

The solid homopolymers prepared in accordance with the teachings of this invention are a useful class of compounds. The ethylene oxide polymers are hard, firm, tough and resinous in character, and they have a reduced viscosity value of from about 1.0 to 25, and higher, in acetonitrile. The ethylene oxide polymers appear to form homogeneous systems with water in all proportions. Although the higher molecular weight poly(ethylene oxides) merely swell on the addition of small amounts of water, on the addition of greater amounts of water these polymers pass into solution. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65°±2° C. throughout the range of reduced viscosity values of from 1 to 25, and greater (in acetonitrile). The crystallization temperature, as determined by measuring the break in the cooling curve, is about 55° C. The ethylene oxide polymers are soluble in water, acetonitrile, chloroform, methanol, and mixtures of water and higher saturated aliphatic alcohols. The ethylene oxide polymers are insoluble in glycerol and normally-liquid saturated aliphatic hydrocarbons.

Unlike resinous poly(ethylene oxide) which is water-soluble, poly(propylene oxide) is water-insoluble. Crude poly(propylene oxide) is obtained as a stiff semi-solid containing a sizeable portion of crystalline poly(propylene oxide). This crystalline fraction can be separated from the crude polymeric product by dissolving said crude product in hot acetone and then chilling to temperatures of the order of −20° C. to −40° C. to precipitate the crystalline polymer. The crystalline propylene oxide polymers are water-insoluble, firm, tough solids, and they have a reduced viscosity value of above about 1.0 in benzene.

The practice of the instant invention also lends itself to the production of solid homopolymers of other 1,2-alkylene oxides such as, for example, poly(butylene oxide), poly(pentylene oxide), and the like.

The copolymers of this invention can be water-soluble or water-insoluble solid compositions depending upon the ratio of the chemically combined monomeric content therein. In general, those copolymers containing a minor proportion, i.e., less than 50 weight percent, of ethylene oxide copolymerized therein are hard, tough, water-insoluble compositions. However, it is generally observed that the preparation of copolymers containing greater than 50 weight percent of ethylene oxide chemically combined in said copolymers, tend to be water-soluble, and this water-soluble characteristic increases as the ethylene oxide content of the resulting copolymer increases. Thus, the instant invention is admirably suited for the preparation of "tailor-made" solid copolymers which have characteristics and properties built into said copolymers; consequently, resinous copolymers covering a spectrum of mechanical properties can be obtained with characteristics that are highly desirable in various fields of application and uses.

The polymers of this invention have a variety of uses. The resinous polymers are useful for the production of various shaped articles, e.g., buttons, brush handles, lamp bases, etc. Resinous poly(ethylene oxides) are useful as coagulants and water-soluble lubricants. The water-soluble and water-insoluble solid polymers are also useful in the preparation of films by conventional techniques such as by milling on a two-roll mill, calendering, solvent casting, and the like. The homopolymers of the lower 1,2-alkylene oxides and the copolymers containing a lower 1,2-alkylene oxide as a comonomer are preferred polymeric classes. Those copolymers containing ethylene oxide, and in particular greater than 50 weight percent ethylene oxide, are especially preferred polymeric classes.

In various illustrative examples below the procedure employed to prepare the polymer was as follows (unless noted otherwise). A 9-inch Pyrex tube 22 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomer mixture was charged to the tube in a "dry box" containing a nitrogen atmosphere. The tube was then closed with a rubber cap, followed by cooling in Dry Ice-acetone bath. The tube was sealed with the vacuum thus obtained. The sealed tube was subsequently inserted into an aluminum block, said aluminum block being agitated by rocking at the desired operating temperature for a given period of time. After this, the tube was cracked open and the reaction product was placed in a vacuum, e.g., about 10 to 30 mm. of Hg at 30°–40° C. until dried.

EXAMPLE 1

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 percent sorbed water. All three of these samples were observed to be active catalysts for the polymerization of ethylene oxide when employed at 0.3 weight percent, based on the weight of the ethylene oxide charge, at 80° C.

On continued heating the said three strontium carbonate samples above 250° C., the catalytic activity thereof was progressively reduced. On heating the samples at a temperature of 350° to 400° C. for 24 to 48 hours, the strontium carbonate samples became essentially inactive as catalysts.

EXAMPLE 2

Example 2 shows the effect of nitrate ion on the preparation and testing of strontium carbonate. Part A shows the preparation and testing of strontium carbonate free from nitrate ion and part B shows the preparation and testing of strontium carbonate precipitated in the presence of nitrate ion.

A. Strontium hydroxide octahydrate (60 grams) was dissolved in 500 ml. of distilled water at 90° C.; the hot solution was filtered and then carbon dioxide was bubbled through the well-stirred solution precipitating strontium carbonate. The precipitate was filtered and dried for 16 hours at 120° C.

Strontium carbonate (0.1 gram) as prepared above was sealed in a small glass tube with 30 grams of ethylene oxide. The tube was then placed in the aluminum block, said block being agitated by rocking; the temperature was maintained at 80° C. After an induction period of 1.75 hours the ethylene oxide was rapidly polymerized to a polymer with a reduced viscosity of 3.9 in acetonitrile. The polymerization was repeated twice more using strontium carbonate from the same preparation. On both occasions the induction period was 1.5 hours and polymer of reduced viscosity 3.9 (in acetonitrile) was obtained.

B. Strontium nitrate (0.1 mol) was dissolved in 1500 milliliters of distilled water. To this solution, a solution of 0.1 mol of sodium carbonate in distilled water was added dropwise with stirring. The precipitated strontium carbonate was collected and dried at 120° C. for 16 hours.

Strontium carbonate (0.1 gram) as prepared above was sealed in a small glass tube with 30 grams of ethylene oxide and the experiment noted in part A was repeated. No polymer was formed after 40 hours at 80° C. The attempted polymerization was repeated and no polymer was formed after 22 hours at 80° C.

The infra-red spectrum of this strontium carbonate, prepared from strontium nitrate, was examined. The spectrum showed the presence of nitrate ion in the catalyst. Further tests showed that the presence of nitrate ion substantially reduced the activity of the catalyst or rendered it totally inactive when tested at 80° C. to 90° C. and in catalyst concentrations of 0.3 to 1 weight percent, based on the weight of the monomeric feed.

EXAMPLE 3

This example also shows the effect of interfering ions. Strontium hydroxide (20 grams) and sodium nitrate (10 grams) were dissolved in 2 liters of water at 90° C. The solution was filtered while still hot. Strontium carbonate was precipitated by bubbling carbon dioxide into the was separated from the solution and dried, without washing, at 120° C. The carbonate so prepared failed to initiate the polymerization of ethylene oxide after a period of 20 hours when used in 1 weight percent concentration, based on the weight of ethylene oxide, at a reaction temperature of 80° C. Infra-red examination of this strontium carbonate showed it to be identical with active strontium carbonate except for the presence of nitrate ion in the carbonate.

The above procedure was repeated using amounts of sodium chlorate, sodium thiosulfate, and sodium tetraborate equivalent to the amount of sodium nitrate used above. In each case the strontium carbonate was inactive as a catalyst. When an amount of sodium nitrite equivalent to the sodium nitrate used above was employed, the strontium carbonate showed only slight catalytic activity.

EXAMPLE 4

This example illustrates the activation of catalytically inactive strontium carbonate prepared in the presence of nitrate ion.

Strontium carbonate, prepared in the presence of nitrate ion and found to be catalytically inactive for the polymerization of ethylene oxide, was repeatedly digested with distilled water. After this treatment the strontium carbonate became catalytically active when employed under the identical conditions as the non-digested strontium carbonate. Examination of the infra-red spectrum of this catalyst showed the presence of adsorbed or occluded nitrate ion to be greatly reduced by the repeated digestions.

EXAMPLE 5

A sample of catalytically active strontium carbonate (known to be catalytically active in that it rapidly polymerized ethylene oxide at 80° C. in a concentration of 3 weight percent after an induction period of 3 hours) was heated at 350° C. for 16 hours. After this heating step the catalyst weight loss was 0.67 percent. Mass spectrometer analysis showed the weight loss to be largely water. The induction period for the polymerization was increased to 20 hours and the rate of polymerization was greatly reduced when the above-described heat-treated catalyst was employed, as above, in 3 weight percent concentration in ethylene oxide at a temperature of 80° C. On shaking this heat-treated strontium carbonate in distilled water and then drying 55° C., the catalyst rapidly polymerized ethylene oxide after an induction period of only 1 to 2 hours under the same conditions of catalyst concentration and reaction temperature.

EXAMPLE 6

A saturated solution of calcium hydroxide in water was prepared at room temperature. Calcium carbonate was precipitated by bubbling carbon dioxide through the solution. The precipitated calcium carbonate was separated by filtration and dried at 120° C. for 2 hours. The calcium carbonate was mixed with ethylene oxide in 3 weight percent concentration at 80° C.; an induction period of 11 to 12 hours was observed. Poly(ethylene oxide) having a reduced viscosity of 24.9 (in acetonitrile) was obtained.

EXAMPLE 7

A solution of 10.6 grams of sodium carbonate in 200 milliliters of distilled water was slowly poured into a stirred solution of 24.4 grams of barium chloride dihydrate dissolved in 1 liter of distilled water. The precipitated barium carbonate was collected and dried at 120° C. for 93 hours. When 0.3 gram of the barium carbonate thus prepared was sealed together with 30 grams of ethylene oxide in a small glass tube and heated to 80° C., with gentle rocking, polymerization began after an induction period of 4 hours and 40 minutes; the polymer formed had a reduced viscosity of 6.6 (in acetonitrile).

EXAMPLE 8

Barium carbonate was prepared in the same manner as that of Example 7 with the exception that barium nitrate was used rather than barium chloride dihydrate. The barium carbonate so prepared was inactive as a polymerization catalyst for ethylene oxide; examination of the infra-red spectrum of this barium carbonate disclosed the presence of nitrate ion in the catalyst.

EXAMPLE 9

Zinc oxide (54 grams) was added to 1 liter of 5 percent sulfuric acid. The solution was brought to a boil and 20 ml. of concentrated sulfuric acid were added. The clear solution was then cooled to 3° C. and a cold solution of potassium bicarbonate saturated with carbon dioxide was added to the solution. The precipitated zinc carbonate was filtered washed with cold water and dried in a desiccator. The zinc carbonate was later dried at 120° C.

Zinc carbonate (1.0 gram) as prepared above was sealed in a glass tube together with 30 grams of ethylene oxide and agitated at 100° C. in a water bath for 24 hours. A 63.5 percent yield of poly(ethylene oxide) having a reduced viscosity value of 3.4 (in acetonitrile) was obtained.

EXAMPLE 10

Cadmium sulfate (208 grams) was dissolved in 1 liter of water and potassium bicarbonate (100 grams) was dissolved in 1 liter of water. Both solutions were colled to 1° C. and the bicarbonate solution was saturated with carbon dioxide. The bicarbonate solution was added to the cadmium sulfate solution, with vigorous stirring, over a period of 30 to 35 minutes. The precipitate was filtered and washed 3 times with cold, carbon dioxide-saturated distilled water. The cadmium carbonate was dried for 24 hours at 180° C.

Cadmium carbonate (0.1 gram) as prepared above was sealed in a glass tube with 30 grams of ethylene oxide and agitated for 16 hours in a water bath maintained at 100° C. The ethylene oxide was essentially completely converted to ethylene oxide polymer with a reduced viscosity of 6.8 (in acetonitrile).

EXAMPLE 11

Ferrous chloride tetrahydrate (20 grams) was dissolved in one liter of distilled water. Sodium carbonate (11 grams) was dissolved in a second liter of water. The sodium carbonate solution was poured slowly, with vigorous stirring, into the ferrous chloride solution. The ferrous carbonate precipitate was filtered, washed four times by slurrying in distilled water, and then dried in an oven at 128° C. for 20 hours.

Two tubes each containing one gram of the dried ferrous carbonate and 30 grams of ethylene oxide were prepared. They were heated to 100° C. for 20.5 hours with gentle rocking. The oxide was 98–99 percent converted to resinous polymer. The reduced viscosities of polymer from the tubes were 6.2 and 5.1 respectively (in acetonitrile).

EXAMPLE 12

Cobaltous chloride hexahydrate (23 grams) was dissolved in one liter of distilled water. Sodium carbonate (11 grams) was dissolved in a second liter of water. The sodium carbonate solution was poured slowly, with vigorous stirring, into the cobaltous chloride solution. The precipitate was washed four times with distilled water and then dried at 128° C. for 36 hours.

Two tubes each containing one gram of the dried cobaltous carbonate and 30 grams of ethylene oxide were prepared. They were heated to 100° C. for 21.5 hours and in both cases the ethylene oxide was converted to polymer with a reduced viscosity of 1.5 (in acetonitrile). The yield was 80 to 85 percent.

EXAMPLE 13

Nickel nitrate hexahydrate (29 grams) was dissolved in one liter of distilled water. Sodium carbonate (11 grams) was dissolved in a second liter of water. The sodium carbonate solution was poured slowly with vigorous stirring into the nickel nitrate solution. The precipitated nickel carbonate was filtered, washed four times with water to remove nitrate ion and dried at 128° C. for 16 hours.

Two tubes each containing 1 gram of the dried nickel carbonate and 30 grams of ethylene oxide were prepared. The tubes were heated to 100° C. for 21.5 hours with gentle rocking. The ethylene oxide was 30 to 40 percent converted to resinous polymer. Samples from the individual tubes had reduced viscosities of 1.46 and 1.43 respectively (in acetonitrile).

EXAMPLE 14

Two tubes were prepared. Each contained fifty milligrams of manganese carbonate and 30 grams of ethylene oxide. The tubes were gently agitated at 100° C. for 21.5 hours. The ethylene oxide was 97 to 98 percent converted to resinous polymer. A sample was taken from each tube and the measured reduced viscosities of these samples were 16.2 and 15.3 respectively (in acetonitrile).

EXAMPLE 15

Lanthanum carbonate was precipitated by the addition of sodium carbonate to an aqueous solution of lanthanum chloride, followed by digesting the resulting precipitate for several hours in water through which carbon dioxide was constantly bubbled. The lanthanum carbonate was dried at elevated temperatures and when employed in 3 weight percent concentration in the bulk polymerization of ethylene oxide at 80° C., this catalyst immediately initiated polymerization to form polymer with a reduced viscosity of 6.6 (in acetonitrile).

EXAMPLE 16

Strontium carbonate (0.9 gram; contained approximately 0.5 weight percent sorbed water) and 30 grams of propylene oxide were sealed in a glass tube and gently agitated in a water bath for 117 hours at 90° C. Essentially complete conversion to a polymer of reduced viscosity of 0.8 in benzene at 30° C. was obtained. Crystalline polymer (2 grams) of a reduced viscosity in benzene of 3.6 was obtained by dissolving 20 grams of the polymer of reduced viscosity of 0.8, in hot acetone, and then precipitating the crystalline fraction by cooling the solution to −40° C., followed by repeating the procedure on the polymer obtained from the first precipitation.

EXAMPLE 17

The procedure of Example 16 was repeated except for the tube and contents being agitated for 72 hours at 90° C. rather than 117 hours. Essentially complete conversion to polymer of reduced viscosity 0.53 (in benzene) resulted. The reaction product (20 grams) was subjected to treatment discussed in Example 16. There was obtained crystalline polymer (2 grams) which had a reduced viscosity in benzene of 1.2.

EXAMPLE 18

Fifteen grams of 1,2-epoxybutane and 0.45 gram of strontium carbonate (contained approximately 0.5 weight percent sorbed water) were sealed in a glass tube and agitated for 280 hours at 93° C. in a water bath. The 1,2-epoxybutane was almost completely converted to white solid.

EXAMPLE 19

In this example various experiments were conducted in which several 30-gram admixtures of ethylene oxide and propylene oxide were copolymerized in the presence of 3.0 weight percent strontium carbonate, based on the total weight of monomeric charge. The strontium carbonate contained approximately 0.5 weight percent of sorbed water. The reduced viscosity value of the resulting copolymer product was determined in acetonitrile. The pertinent data and results are set forth in Table I below.

*Table I*

| Wt. Percent Propylene Oxide | Temp., °C. | Reaction Time; Hours | Yield; Grams | Reduced Viscosity |
|---|---|---|---|---|
| 10 | 110 | 3 | 29.3 | 1.08 |
| 10 | 90 | 64 | 30.0 | 1.9 |
| 10 | 95 | 16 | 30.0 | 3.1 |
| 10 | 90 | 5¼ | 15.4 | 2.25 |
| 10 | 95 | 4½ | 12.1 | 2.53 |
| 16.6 | 90 | 16 | 30.0 | 2.1 |
| 20 | 110 | 16 | 24.5 | 4.25 |
| 20 | 90 | 64 | 30.0 | 3.0 |
| 20 | 95 | 16 | 28.4 | 1.3 |
| 20 | 90 | 6½ | 10.9 | 2.25 |
| 30 | 90 | 16 | 23.5 | 1.07 |
| 30 | 95 | 16 | 24.4 | 1.03 |
| 40 | 95 | 20 | 21.1 | 1.31 |
| 40 | 93 | 16¼ | 20.0 | 1.33 |
| 60 | 90 | 15¾ | 8.65 | 0.62 |
| 60 | 90 | 16 | 17.8 | 1.4 |
| 60 | 93 | 16¼ | 11.7 | 0.74 |
| 60 | 93 | 16¼ | 8.4 | 0.92 |
| 80 | 93 | 40¼ | 7.1 | 0.79 |
| 80 | 93 | 21½ | 4.7 | 0.61 |

EXAMPLE 20

In this example various experiments were conducted in several 30-gram admixtures of ethylene oxide and 2,3-epoxybutane (mixture of cis and trans isomers) were copolymerized in the presence of 3.0 weight percent strontium carbonate, based on the total weight of monomeric charge. The strontium carbonate contained approximately 0.5 weight percent of sorbed water. The reduced viscosity value of the resulting copolymer product was determined in acetonitrile. The pertinent data and results are set forth in Table II below.

*Table II*

| Wt. Percent 2,3-Epoxybutane | Temp., ° C. | Reaction Time, Hours | Yield, Grams | Reduced Viscosity |
|---|---|---|---|---|
| 10 | 90 | 16 | 29 | 1.34 |
| 10 | 90 | 18 | 32 | 1.5 |
| 16.6 | 90 | 16 | 30 | 1.2 |
| 20 | 90 | 16 | 25 | 0.69 |
| 26.5 | 90 | 15 | 13 | 0.9 |
| 30 | 90 | 16 | 23 | 0.61 |
| 33.3 | 90 | 16 | 22 | 0.75 |
| 40 | 90 | 16 | 19 | 0.50 |
| 40 | 90 | 16 | 19 | 1.2 |

EXAMPLE 21

Various experiments were conducted in which several 30-gram admixtures of ethylene oxide and 1,2-epoxybutane were copolymerized in the presence of 3.0 weight percent strontium carbonate, based on the total weight of monomeric charge. The catalyst contained about 0.5 weight percent of sorbed water. The reduced viscosity value of the resulting copolymer was ascertained in acetonitrile. The pertinent data and results are set forth in Table III below.

*Table III*

| Wt. Percent 1,2-Epoxybutane | Temp., ° C. | Reaction Time, Hours | Yield, Grams | Reduced Viscosity |
|---|---|---|---|---|
| 10 | 90 | 16 | 20.0 | 1.5 |
| 10 | 93 | 16 | 29.8 | 1.14 |
| 20 | 90 | 16 | 27.5 | 1.1 |
| 20 | 93 | 16 | 29.3 | 0.83 |
| 30 | 90 | 16 | 25.5 | 0.84 |
| 40 | 90 | 16 | 21.7 | 0.83 |

EXAMPLE 22

Isobutylene oxide (3 grams), ethylene oxide (27 grams), and strontium carbonate (0.9 gram; contained approximately 0.5 weight percent sorbed water) were sealed in a glass tube which was then agitated for 24 hours at 110° C. in a water bath. At the end of this period of time, the tube was broken and the contents were examined. A copolymer product (28.2 grams) which had a reduced viscosity value of 1.35 in acetonitrile was obtained.

EXAMPLE 23

Two experiments were conducted in which two 30-gram admixtures of styrene oxide and ethylene oxide were copolymerized in the presence of 3.0 weight percent strontium carbonate, based on the total weight of monomeric charge. The catalyst contained about 0.5 weight percent of sorbed water. The reduced viscosity value of the resulting copolymer was ascertained in acetonitrile. The pertinent data and results are set forth in Table IV below.

*Table IV*

| Wt. Percent Styrene Oxide | Temp., °C. | Reaction Time, Hours | Yield, Grams | Reduced Viscosity |
|---|---|---|---|---|
| 10 | 90 | 96.5 | 30 | 1.2 |
| 20 | 90 | 96.5 | 26.5 | 0.9 |

EXAMPLE 24

Two experiments were conducted in which two 30-gram admixtures of 1,2-epoxyhexadecane and ethylene oxide were copolymerized in the presence of 3.0 weight percent strontium carbonate, based on the total weight of monomeric charge. The catalyst contained about 0.5 weight percent of sorbed water. The reduced viscosity value of the resulting copolymer was ascertained in acetonitrile. The pertinent data and results are set forth in Table V below.

*Table V*

| Wt. Percent 1,2-Epoxyhexadecane | Temp., °C. | Reaction Time, Hours | Yield, Grams | Reduced Viscosity |
|---|---|---|---|---|
| 10 | 90 | 66 | 30 | 1.9 |
| 20 | 90 | 66 | 30 | 1.0 |

EXAMPLE 25

Two experiments were conducted in which two 30-gram admixtures of chlorostyrene oxide (isomeric mixture of ortho- and para-chlorostyrene oxide) and ethylene oxide were copolymerized in the presence of 3.0 weight percent strontium carbonate, based on the total weight of monomeric charge. The catalyst contained about 0.5 weight percent of sorbed water. The reduced viscosity value of the resulting copolymer was ascertained in acetonitrile. The pertinent data and results are set forth in Table VI below.

*Table VI*

| Wt. Percent Chlorostyrene Oxide | Temp., °C. | Reaction Time, Hours | Yield, Grams | Reduced Viscosity |
|---|---|---|---|---|
| 20 | 90 | 22 | 29.9 | 1.8 |
| 40 | 90 | 22 | 15.8 | 0.7 |

EXAMPLE 26

To a glass tube there were charged 15 grams of toluene, 1.5 grams of ethylene oxide, 13.5 grams of propylene oxide, and 0.6 gram of zinc carbonate (contained approximately 11 weight percent of sorbed water). The tube was sealed and then inserted into an aluminum block which was gently agitated for a period of 159 hours at 90° C. At the end of this period of time the tube was broken open and the reaction product was washed with about 100 milliliters of hexane. Subsequently, the resulting copolymer product was dried under reduced pressure at 30°–40° C. There was obtained 4 grams of a white, water-insoluble copolymer which had a reduced viscosity value of 1.15 in benzene.

When an equivalent amount of cyclohexane oxide is substituted for ethylene oxide in the above reaction, a solid, water-insoluble copolymer is obtained.

EXAMPLE 27

In the same manner as Example 26 supra, 15 grams of toluene, 6 grams of ethylene oxide, 9 grams of 1,2-epoxydodecane, and 0.6 gram of zinc carbonate (contained approximately 11 weight percent of sorbed water) were reacted in the glass tube for a period of 159 hours at 90° C. The resulting copolymer product was recovered as explained in Example 27 above. There was obtained 5 grams of a white, solid copolymer which had a reduced viscosity of 0.35 in benzene.

When an equivalent amount of propylene oxide is substituted for ethylene oxide in the above reaction, a solid, water-insoluble copolymer is obtained.

EXAMPLE 28

In the same manner as Example 26 supra, 15 grams of toluene, 10.5 grams of propylene oxide, 4.5 grams of styrene oxide, and 0.6 gram of zinc carbonate (contained approximately 11 weight percent of sorbed water) were reacted in the glass tube for a period of 159 hours at 90° C. The resulting copolymer product was recovered as explained in Example 26 above. There was obtained one gram of a soft, white copolymer which had a reduced viscosity of 0.23 in benzene.

By substituting 4-methyl-2,3-epoxypentane for styrene oxide in the above reaction, there is obtained a solid, water-insoluble copolymer.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises contacting a vicinal-epoxyhydrocarbon which has a single vicinal epoxy group and which is free from unsaturation other than benzenoid unsaturation, with from about 0.01 to about 5 weight percent, based on the weight of said vicinal-epoxyhydrocarbon, of a divalent metal carbonate catalyst, the metal portion of which is selected from the group consisting of magnesium, calcium, strontium, barium, zinc, cadmium, iron, cobalt, nickel, chromium, and manganese, said divalent metal carbonate containing at least about 0.01 weight percent of sorbed water, based on the weight of said divalent metal carbonate, said divalent metal carbonate containing a maximum of about one weight percent of non-sorbed water, based on the weight of said vicinal-epoxyhydrocarbon; at a temperature in the range of from about 70° C. to about 150° C.; for a period of time sufficient to produce a solid polymer.

2. The process of claim 1 wherein said vicinal-epoxyhydrocarbon is selected from the group consisting of ethylene oxide, propylene oxide, butylene oxide, and styrene oxide.

3. The process of claim 2 wherein said divalent metal carbonate contains at least about 0.1 weight percent sorbed water, based on the weight of said divalent metal carbonate.

4. A process which comprises contacting an admixture containing as the sole active ingredients at least two vicinal-epoxyhydrocarbons which have a single vicinal epoxy group and which are free from unsaturation other than benzenoid unsaturation; with from about 0.01 to about 5 weight percent, based on the weight of said vicinal-epoxyhydrocarbons, of a divalent metal carbonate catalyst, the metal portion of which is selected from the group consisting of magnesium, calcium, strontium, barium, zinc, cadmium, iron, cobalt, nickel, chromium and manganese, said divalent metal carbonate containing at least about 0.01 weight percent of sorbed water, based on the weight of said divalent metal carbonate, said divalent metal carbonate containing a maximum of about one weight percent of non-sorbed water, based on the weight of said vicinal-epoxyhydrocarbons; at a temperature in the range of from about 70° C. to about 150° C.; for a period of time sufficient to produce a solid copolymer.

5. The process of claim 4 wherein said vicinal-epoxyhydrocarbons are selected from the group consisting of ethylene oxide, propylene oxide, butylene oxide, and styrene oxide.

6. The process of claim 5 wherein said divalent metal carbonate contains at least about 0.1 weight percent sorbed water, based on the weight of said divalent metal carbonate.

7. The process of claim 6 wherein said admixture contains ethylene oxide and propylene oxide as the sole active ingredients.

8. The process of claim 6 wherein said admixture contains ethylene oxide and butylene oxide as the sole active ingredients.

9. The process of claim 6 wherein said admixture contains ethylene oxide and styrene oxide as the sole active ingredients.

10. A process which comprises contacting ethylene oxide with from about 0.01 weight percent, based on the weight of said ethylene oxide, of an alkaline earth metal carbonate, the metal portion of which has an atomic number greater than 19 and less than 57, said metal carbonate containing at least about 0.01 weight percent of sorbed water, based on the weight of said carbonate, said metal carbonate containing a maximum of one one weight percent non-sorbed water, based on the weight of said ethylene oxide; at a temperature in the range of from about 70° C. to about 150° C.; for a period of time sufficient to produce poly(ethylene oxide) which has a reduced viscosity value of at least about 1.0 as determined at a concentration of 0.2 gram of said poly(ethylene oxide) in 100 milliliters of acetonitrile at 30° C.

11. The process of claim 10 wherein said alkaline earth metal carbonate is strontium carbonate.

12. The process of claim 10 wherein said alkaline earth metal carbonate is calcium carbonate.

13. The process of claim 10 wherein said alkaline earth metal carbonate is barium carbonate.

14. A process which comprises contacting ethylene oxide with from about 0.01 to about 5.0 weight percent of zinc carbonate, based on the weight of said ethylene oxide, said zinc carbonate containing at least about 0.01 weight percent of sorbed water, based on the weight of said zinc carbonate, said zinc carbonate containing a maximum of about one weight percent non-sorbed water, based on the weight of said said ethylene oxide; at a temperature in the range of from about 70° C. to about 150° C.; for a period of time sufficient to produce poly(ethylene oxide) which has a reduced viscosity value of at least about 1.0 as determined at a concentration of 0.2 gram of said poly(ethylene oxide) in 100 milliliters of acetonitrile at 30° C.

15. A process which comprises contacting ethylene oxide with from about 0.01 to about 5.0 weight percent of manganous carbonate, based on the weight of said ethylene oxide, said manganous carbonate containing at least about 0.01 weight percent of sorbed water, based on the weight of said manganous carbonate, said manganous carbonate containing a maximum of about one weight percent non-sorbed water, based on the weight of said ethylene oxide; at a temperature in the range of from about 70° C. to about 150° C.; for a period of time sufficient to produce poly(ethylene oxide) which has a reduced viscosity value of at least about 1.0 as determined at a concentration of 0.2 gram of said poly(ethylene oxide) in 100 milliliters of acetonitrile at 30° C.

References Cited in the file of this patent

UNITED STATES PATENTS 2,706,181   Pruit et al. _____ Apr. 12, 1955

OTHER REFERENCES

Staudinger et al.: "Annolen der Chemie," vol. 505, pp. 41–50 (1133).

UNITED STATES PATENT OFFICE
CERTIFICATION OF CORRECTION

Patent No. 2,987,489                                        June 6, 1961

Frederick E. Bailey, Jr., et al.

It is hereby certified that error appears in the above numbered patent requiring correction and that the said Letters Patent should read as corrected below.

Column 2, line 2, for "noval" read -- novel --; column 3, line 65, for "exponuded" read -- expounded --; column 5, line 2, for "corbonate" read -- carbonate --; line 28, for "zince" read -- zinc --; column 6, line 17, after "active" insert -- and inactive --; column 10, line 15, after "0.5" insert -- weight --; column 11, line 3, after "the" insert -- stirred solution. The strontium carbonate precipitate --; column 12, line 33, for "colled" read -- cooled --; column 14, line 31, after "in", second occurrence, insert -- which --; column 17, line 40, strike out "one", second occurrence; column 18, line 16, strike out "said", second occurrence.

Signed and sealed this 28th day of November 1961.

(SEAL)
Attest:

ERNEST W. SWIDER                                  DAVID L. LADD
Attesting Officer                                 Commissioner of Patents